(12) United States Patent
Oka (10) Patent No.: US 12,002,004 B2
(45) Date of Patent: Jun. 4, 2024

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventor: Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/514,330

(22) Filed: Oct. 29, 2021

(65) Prior Publication Data

US 2022/0198378 A1 Jun. 23, 2022

(30) Foreign Application Priority Data

Dec. 18, 2020 (JP) ................................ 2020-210496

(51) Int. Cl.
*G06Q 10/087* (2023.01)
*G01G 23/37* (2006.01)
*G06K 19/07* (2006.01)
*G06Q 10/0631* (2023.01)
*G06Q 30/0601* (2023.01)

(52) U.S. Cl.
CPC ....... *G06Q 10/087* (2013.01); *G01G 23/3742* (2013.01); *G06K 19/0723* (2013.01); *G06Q 10/06315* (2013.01); *G06Q 30/0633* (2013.01)

(58) Field of Classification Search
CPC ........... G06Q 10/087; G06Q 10/06315; G06Q 30/0633; G01G 23/3742; G01G 19/42; G06K 19/0723
USPC ............................................................ 705/28
See application file for complete search history.

(56) References Cited

U.S. PATENT DOCUMENTS

| 10,198,710 | B1* | 2/2019 | Hahn | G01G 19/4144 |
|---|---|---|---|---|
| 10,713,615 | B2* | 7/2020 | Smith | G06Q 10/087 |
| 10,753,787 | B1* | 8/2020 | Shiee | G06Q 10/087 |
| 11,087,603 | B2* | 8/2021 | Mizuno | G08B 13/1472 |
| 11,315,074 | B2* | 4/2022 | Neubarth | G06Q 90/20 |
| 11,436,557 | B1* | 9/2022 | Kumar | G01G 19/387 |
| 2018/0218312 | A1* | 8/2018 | Smith | G06Q 30/0633 |
| 2019/0177012 | A1* | 6/2019 | Feiner | B65B 1/46 |
| 2020/0013002 | A1* | 1/2020 | Hayashi | G01G 23/18 |

FOREIGN PATENT DOCUMENTS

| JP | 2020-008331 A | 1/2020 | |
|---|---|---|---|
| JP | 2020-063154 A | 4/2020 | |
| WO | WO-2016040601 A1 * | 3/2016 | ........... A47L 7/0047 |

* cited by examiner

*Primary Examiner* — Garcia Ade
(74) *Attorney, Agent, or Firm* — Oliff PLC (57) ABSTRACT

An information processing device includes a controller configured to execute acquiring a detection value obtained by detecting an amount of a product stored in a storage location corresponding to the product by a sensor, and transmitting a notification regarding a storage error of the product to a user terminal in a case where a decrease amount of the product based on the detection value of the sensor in a predetermined period is larger than a threshold value.

17 Claims, 6 Drawing Sheets

| SENSOR ID | PRODUCT ID | TIME | MEASUREMENT VALUE | PREDETERMINED MASS | ORDER AMOUNT | DECREASE RATE | THRESHOLD VALUE OF DECREASE RATE |
|---|---|---|---|---|---|---|---|
| x x x | x x x | x x x | x x x | x x x | x x x | x x x | x x x |
| x x x | x x x | x x x | x x x | x x x | x x x | x x x | x x x |
| x x x | x x x | x x x | x x x | x x x | x x x | x x x | x x x |
| . | . | . | . | . | . | . | . |

INFORMATION PROCESSING DEVICE, INFORMATION PROCESSING METHOD, AND SYSTEM

CROSS-REFERENCE TO RELATED APPLICATION

This application claims priority to Japanese Patent Application No. 2020-210496 filed on Dec. 18, 2020, incorporated herein by reference in its entirety.

BACKGROUND

1. Technical Field

The present disclosure relates to an information processing device, an information processing method, and a system.

2. Description of Related Art

It is known that a remaining amount of a product is calculated based on mass at a storage location of the product (for example, Japanese Unexamined Patent Application Publication No. 2020-008331 (JP 2020-008331 A)).

SUMMARY

In a case where a user places the product in an incorrect storage location, accurate management of stock of the product is difficult. The present disclosure is to manage the stock of the product more accurately.

A first aspect of the present disclosure relates to an information processing device including a controller. The controller is configured to execute acquiring a detection value obtained by detecting an amount of a product stored in a storage location corresponding to the product by a sensor. The controller is configured to execute transmitting a notification regarding a storage error of the product to a user terminal in a case where a decrease amount of the product based on the detection value of the sensor in a predetermined period is larger than a threshold value.

A second aspect of the present disclosure relates to an information processing method executed by a computer, the information processing method including acquiring a detection value obtained by detecting an amount of a product stored in a storage location corresponding to the product by a sensor, and transmitting a notification regarding a storage error of the product to a user terminal in a case where a decrease amount of the product based on the detection value of the sensor in a predetermined period is larger than a threshold value.

A system according to a third aspect of the present disclosure includes a sensor and a server including a controller. The sensor is configured to detect an amount of a product stored in a storage location corresponding to the product. The controller is configured to execute acquiring a detection value detected by the sensor. The controller is configured to execute transmitting a notification regarding a storage error of the product to a user terminal in a case where a decrease amount of the product based on the detection value of the sensor in a predetermined period is larger than a threshold value.

A fourth aspect of the present disclosure relates to a program that causes a computer to execute the information processing method, or a computer-readable storage medium that non-transitorily stores the program.

According to the present disclosure, the stock of the product can be managed more accurately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device according to an embodiment of the present disclosure includes a controller. The controller executes acquiring a detection value obtained by detecting an amount of a product stored in a storage location corresponding to the product by a sensor, and transmitting a notification regarding a storage error of the product to a user terminal in a case where a decrease amount of the product based on the detection value of the sensor in a predetermined period is larger than a threshold value.

The sensor can detect the amount (for example, mass or number) of the product stored in the storage location. The sensor is, for example, a sensor that detects the mass of the product placed in the storage location, or a sensor that detects an IC tag attached to the product. The product associated with the storage location is placed in the storage location. Therefore, the amount of the product can be detected by detecting the product placed in the storage location by the sensor. However, since a user places the product in the storage location, in a case where the user does not place the product in the correct storage location, the amount of the product may be incorrectly detected.

Therefore, the controller transmits the notification regarding the storage error of the product to the user terminal in a case where the decrease amount of the product based on the detection value of the sensor in the predetermined period is larger than the threshold value. The threshold value here is, for example, an upper limit value of the decrease amount of the product in the predetermined period when the user consumes the product by normal use, and is a value set based on, for example, the past decrease amount of the product in the predetermined period. The threshold value may be an average value of the past decrease amounts of the product detected at each of a plurality of predetermined periods, or a value obtained by giving a certain margin to the average value.

In addition, the predetermined period is, for example, a period in which there is a clear difference in the decrease amount of the product between a case where the product is stored correctly and a case where the product is stored incorrectly. Examples of a case where the decrease amount of the product in the predetermined period is larger than the threshold value includes a case where the consumption of the product is larger than normal, and for example, there is a case where the product is misplaced or the IC tag is attached incorrectly. Therefore, the controller transmits the notification regarding the storage error of the product to the user terminal. Examples of the notification regarding the storage error of the product include a notification that the storage location of the product is incorrect, or a notification that the IC tag attached to the product is incorrect. On the user terminal that receives this notification, for example, an image in response to this notification is displayed, so that the user can be aware of the error. As a result, for example, when the product is placed in the correct position, the subsequent stock of the product can be grasped more accurately.

Hereinafter, embodiments of the present disclosure will be described based on the drawings. The configurations of the embodiments described below are examples, and the present disclosure is not limited to the configurations of the embodiments. Further, the embodiments described below can be combined as much as possible.

First Embodiment

Figure 1:
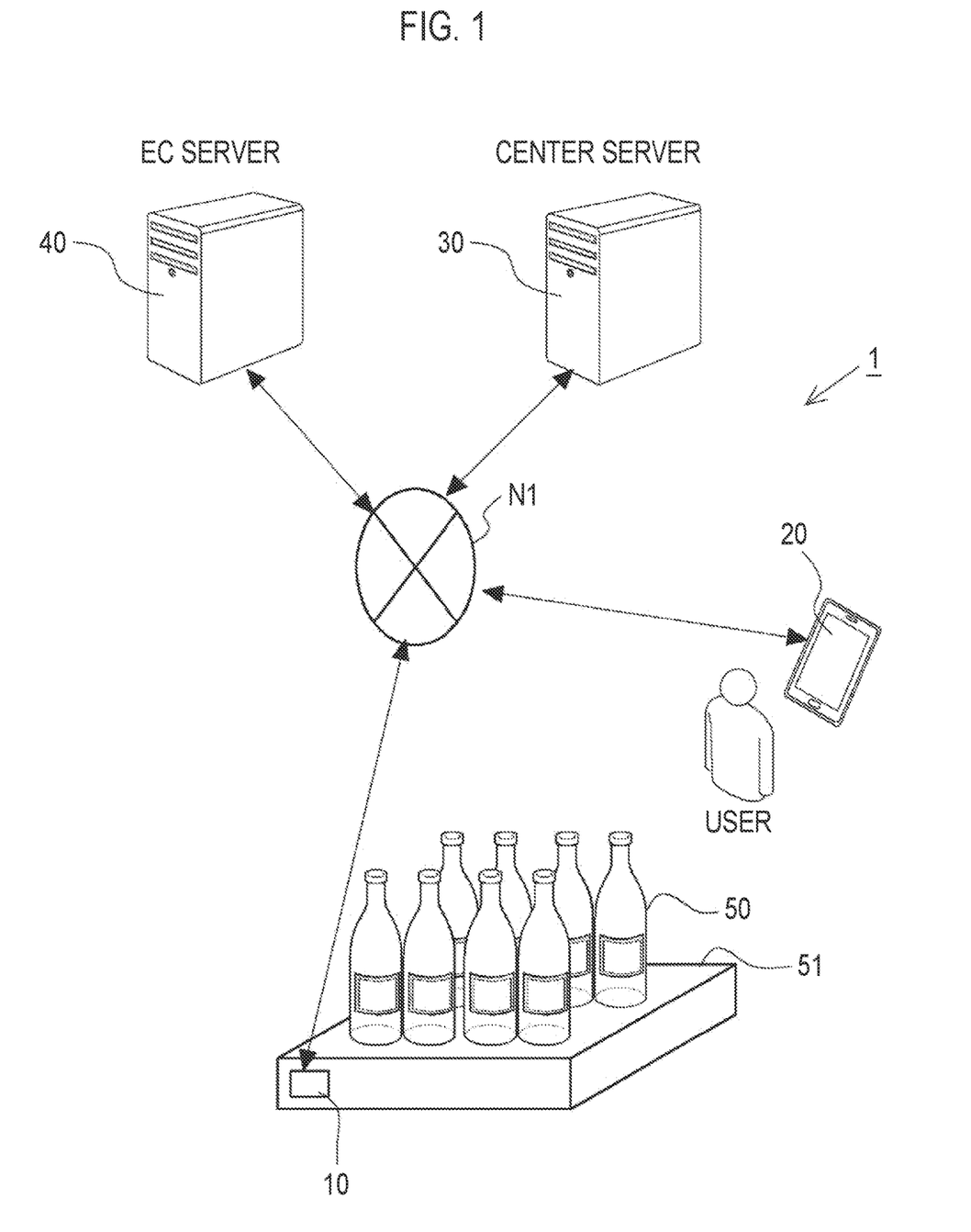
FIG. 1 is a diagram showing a schematic configuration of a stock management system according to an embodiment.

FIG. 1 is a diagram showing a schematic configuration of a stock management system 1 according to the present embodiment. The stock management system 1 is a system that manages the stock of a purchased product stored in a predetermined storage location, for example, at user's home. The stock management system 1 includes a sensor device 10 provided in a storage location 51, a user terminal 20 of the user associated with the sensor device 10, a center server 30, and an EC server 40. Note that in an example shown in FIG. 1, the storage location 51 indicates one step of a storage warehouse or a storage shelf installed in user's home. However, the storage location 51 is not limited to the above, and the storage location 51 may be a box in which the sensor device 10 is installed, a mat, or the like. Also, the storage location 51 may be installed in, for example, an office and a factory.

A product 50 stored in the storage location 51 is assumed to be limited to a single product registered in advance. Further, the product 50 is assumed to be loaded on one plate in which mass of the loaded product can be detected by one mass sensor without spanning a plurality of steps.

The sensor device 10 is, for example, a control device that includes the mass sensor that measures the mass of the product loaded in the storage location 51. The sensor device 10 may be sold integrally with the storage location 51, or may be sold as a single body and post-installed in the storage location 51. The sensor device 10 is wirelessly connected to, for example, a relay device installed at home and connected to a network N1.

The product 50 stored in the storage location 51 is, for example, a beverage, food, a foodstuff, such as seasoning, daily necessities, and a detergent. However, the product stored in the storage location 51 is not limited to the above. The sensor device 10 transmits a measurement value to the center server 30, for example, in a case where the mass of the product loaded in the storage location 51 is measured at a predetermined cycle and/or in a case where the mass of the product loaded in the storage location 51 is changed.

When the center server 30 receives the measurement value of the mass from the sensor device 10, the center server 30 updates the total mass of the product 50 stored in the storage location 51. Note that the total mass of the product 50 stored in the storage location 51 is also referred to as the mass of the stock, in the following. When the mass of the stock is smaller than predetermined mass, the center server 30 orders the product 50 in a predetermined amount (hereinafter, also referred to as an order amount) from the EC server 40. The EC server 40 is a server that manages a real physical store or a store on the Web.

The sensor device 10, the user terminal 20, the center server 30, and the EC server 40 are connected to each other by the network N1. Note that the network N1 is a worldwide public communication network, such as the Internet, and a wide area network (WAN) or other communication networks may be employed as the network N1, for example. Further, the network N1 may include a telephone communication network, such as a mobile phone, or a wireless communication network, such as Wi-Fi (registered trademark). FIG. 1 shows one storage location 51 as an example, but a plurality of the storage locations 51 can be present. The corresponding product 50 is associated with each storage location 51. In addition, a plurality of the users and a plurality of the user terminals 20 can be present.

Figure 2:
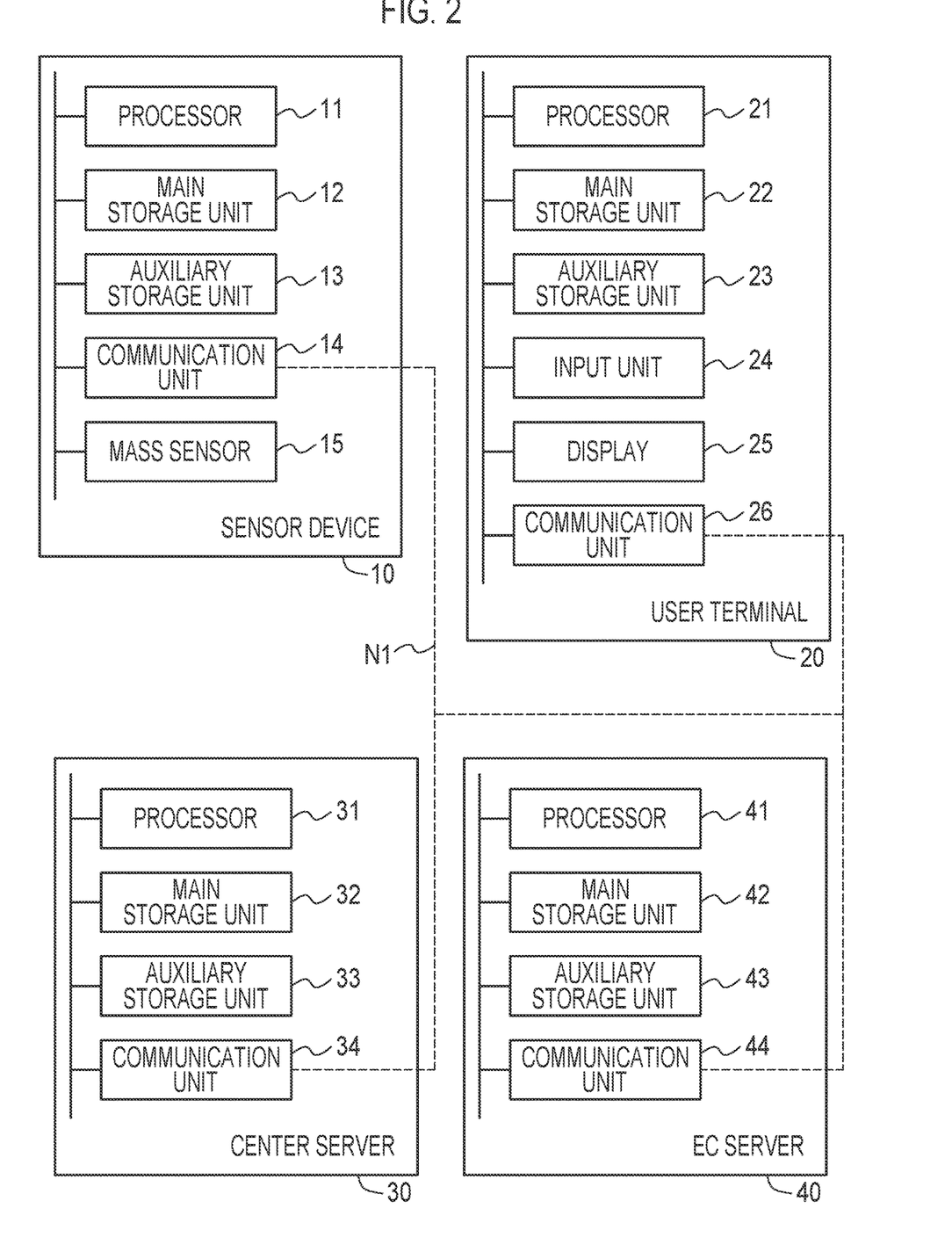
FIG. 2 is a block diagram schematically showing an example of each configuration of a sensor device, a user terminal, a center server, and an EC server constituting the stock management system according to the embodiment.

The hardware configurations and the functional configurations of the sensor device 10, the user terminal 20, the center server 30, and the EC server 40 will be described based on FIG. 2. FIG. 2 is a block diagram schematically showing an example of each configuration of the sensor device 10, the user terminal 20, the center server 30, and the EC server 40 constituting the stock management system 1 according to the present embodiment.

The center server 30 has a general computer configuration. The center server 30 has a processor 31, a main storage unit 32, an auxiliary storage unit 33, and a communication unit 34. These components are connected to each other by a bus. Note that the processor 31 is an example of the "controller". Further, the main storage unit 32 and the auxiliary storage unit 33 are examples of a storage unit.

The processor 31 is a central processing unit (CPU), a digital signal processor (DSP), or the like. The processor 31 controls the center server 30 to execute various information processing operations. The main storage unit 32 is a random access memory (RAM), a read only memory (ROM), or the like. The auxiliary storage unit 33 is an erasable programmable (EP) ROM, a hard disk drive (HDD), a removable medium, or the like. An operating system (OS), various programs, various tables, and the like are stored in the auxiliary storage unit 33. The processor 31 loads the program stored in the auxiliary storage unit 33 into a work region of the main storage unit 32 and executes the program, the components, and the like are controlled through the execution of this program. As a result, the center server 30 realizes a function that satisfies a predetermined purpose. The main storage unit 32 and the auxiliary storage unit 33 are computer-readable recording media. Note that the center server 30 may be a single computer, or may be a plurality of computers linked together. Also, information stored in the auxiliary storage unit 33 may be stored in the main storage unit 32. In addition, information stored in the main storage unit 32 may be stored in the auxiliary storage unit 33.

The communication unit 34 is means for performing communication with the sensor device 10, the user terminal 20, and the EC server 40 via the network N1. The communication unit 34 is, for example, a local area network (LAN) interface board or a wireless communication circuit for wireless communication. The LAN interface board or the wireless communication circuit is connected to the network N1.

Note that a series of processes executed in the center server 30 can be executed by hardware, and can also be executed by software.

Hereinafter, the sensor device 10 will be described. The sensor device 10 has a processor 11, a main storage unit 12, an auxiliary storage unit 13, a communication unit 14, and a mass sensor 15. These components are connected to each other by a bus. The processor 11, the main storage unit 12, and the auxiliary storage unit 13 are the same as the processor 31, the main storage unit 32, and the auxiliary storage unit 33 of the center server 30, and thus the description thereof will be omitted.

The communication unit 14 is an interface that performs input and output of the information to and from the network N1. For example, the communication unit 14 performs the wireless communication, such as Wi-Fi or Bluetooth (registered trademark) Low Energy (BLE), is, for example, connected to the relay device, such as an access point installed at user's home, to access to the network N1, and performs communication with the center server 30.

The mass sensor 15 measures, for example, the mass of the product 50 loaded in the storage location 51 (that is, the mass of the stock) at the predetermined cycle. A measurement cycle of the mass sensor 15 is optionally set in a range of, for example, 100 milliseconds to 1 minute. The mass sensor 15 outputs the measurement value to the processor 11. Note that a plurality of the mass sensors 15 may be connected to the sensor device 10. For example, in a case where the storage location 51 is the storage shelf that includes a plurality of shelves, the mass sensor 15 is provided in each shelf, and the total mass of the products 50 stored on each shelf is calculated to manage the mass of the product 50 stored in the storage location 51.

Hereinafter, the user terminal 20 will be described. For example, the user terminal 20 is a small computer, such as a smartphone, a mobile phone, a tablet terminal, a personal information terminal, a wearable computer (smart watch or the like), or a personal computer (PC). The user terminal 20 has a processor 21, a main storage unit 22, an auxiliary storage unit 23, an input unit 24, a display 25, and a communication unit 26. These components are connected to each other by a bus. The processor 21, the main storage unit 22, and the auxiliary storage unit 23 are the same as the processor 31, the main storage unit 32, and the auxiliary storage unit 33 of the center server 30, and thus the description thereof will be omitted.

The input unit 24 is means for receiving an input operation performed by the user, and is, for example, a touch panel, a mouse, a keyboard, or a push button. The display 25 is means for presenting the information to the user, and is, for example, a liquid crystal display (LCD) or electroluminescence (EL) panel. The input unit 24 and the display 25 may be configured as one touch panel display.

The communication unit 26 is communication means for connecting the user terminal 20 to the network N1. For example, the communication unit 26 is a circuit for performing communication with other devices (for example, center server 30) via the network N1 by using a mobile communication service (for example, a telephone communication network, such as 5th generation (5G), 4th generation (4G), 3rd generation (3G), or long term evolution (LTE)) or a wireless communication network, such as Wi-Fi (registered trademark) or Bluetooth (registered trademark).

The EC server 40 is a computer that performs electronic commerce, and performs at least commerce of the product 50 with the center server 30. The EC server 40 executes a process of receiving an order for the product 50 from the center server 30, and executes a process of providing the product 50 for which the order is received to the user. Note that the EC server 40 executes a process of notifying, for example, a delivery center of a name of the product to be delivered and a delivery destination. Note that existing means, such as a home delivery service, can be used for actual delivery, and thus the description thereof will be omitted. The EC server 40 has a processor 41, a main storage unit 42, an auxiliary storage unit 43, and a communication unit 44. The processor 41, the main storage unit 42, the auxiliary storage unit 43, and the communication unit 44 of the EC server 40 are the same as the processor 31, the main storage unit 32, the auxiliary storage unit 33, and the communication unit 34 of the center server 30, and thus the description thereof will be omitted.

Figure 3:
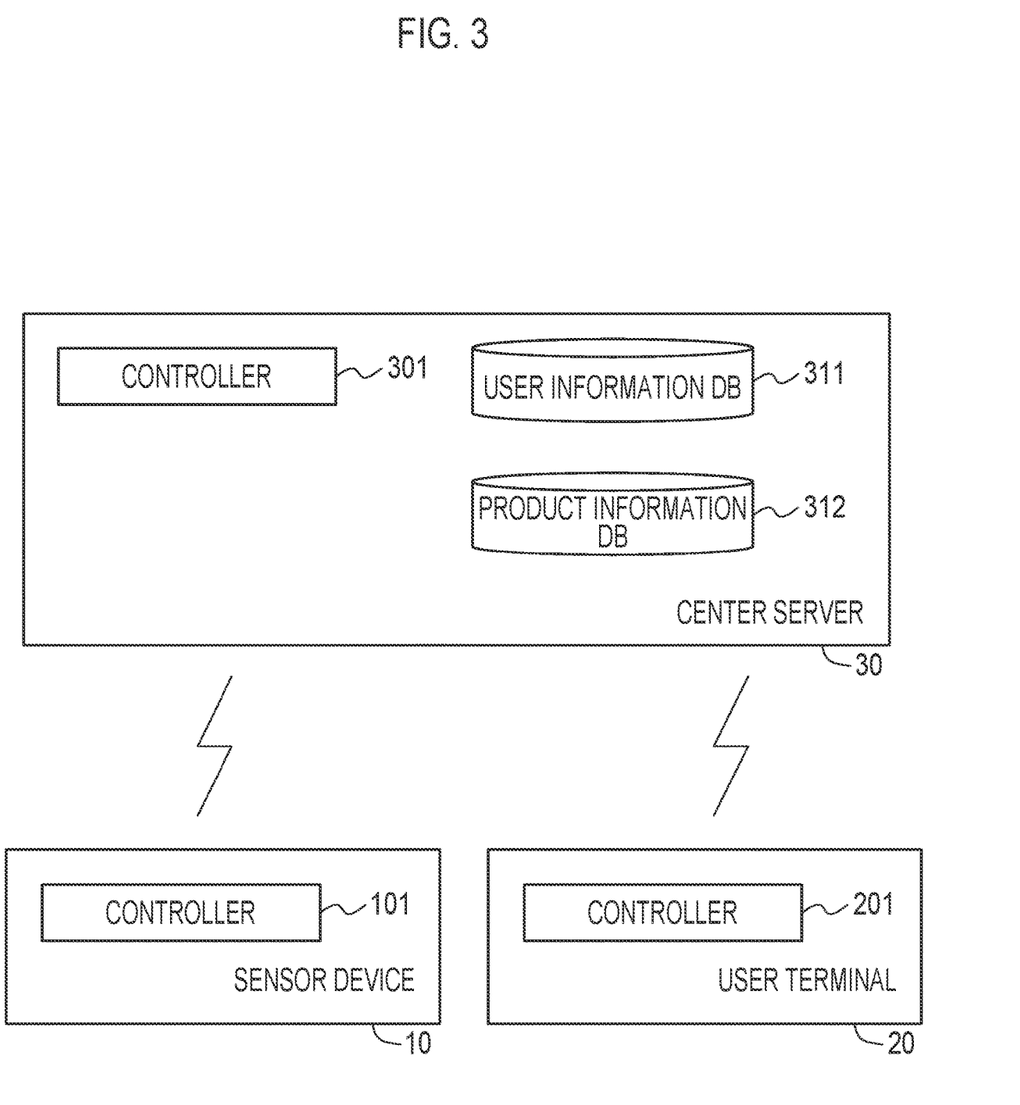
FIG. 3 is a diagram showing an example of each functional configuration of the sensor device, the user terminal, and the center server.

Next, FIG. 3 is a diagram showing an example of each functional configuration of the sensor device 10, the user terminal 20, and the center server 30. First, the sensor device 10 includes, as a functional component, a controller 101. The processor 11 of the sensor device 10 executes a process of the controller 101 by a computer program on the main storage unit 12. Note that a part of the controller 101 may be executed by a hardware circuit. The controller 101 receives input of the measurement value of the mass of the product 50 loaded in the storage location 51 at the predetermined cycle, from the mass sensor 15. When the controller 101 receives the input of the measurement value of the mass of the product 50 loaded in the storage location 51 from the mass sensor 15, the controller 101 generates mass information and transmits the generated mass information to the center server 30. The mass information includes, for example, a time stamp, identification information (sensor ID) of the mass sensor 15, and the measurement value.

Next, the center server 30 includes, as functional components, a controller 301, a user information DB 311, and a product information DB 312. The processor 31 of the center server 30 executes the process of the controller 301 by the computer program on the main storage unit 32. Note that any one of the functional components or a part of the processes thereof may be executed by the hardware circuit.

The user information DB 311 and the product information DB 312 are constructed by managing data stored in the auxiliary storage unit 33 by a program of a database management system (DBMS) executed by the processor 31. The user information DB 311 and the product information DB 312 are relational databases, for example.

The controller 301 receives the mass information from the sensor device 10. In a case where the measurement value is smaller than the predetermined mass, the controller 301 executes a process of ordering the product 50 from the EC server 40, or notifies the user terminal 20 that a stock amount of the product 50 is small. The predetermined mass used in this process may be set depending on the product 50. Also, the predetermined mass used in this process may be designated by the user.

When ordering the product 50, the controller 301 transmits information regarding the product 50, information regarding an order amount, and information regarding the delivery destination to the EC server 40. The information regarding the product to be transmitted to the EC server 40 is information in which the product 50 can be identified, for example, the name of the product or a product ID. The information regarding the order amount to be transmitted to the EC server 40 is the information regarding the amount of the product 50 to be ordered at one time. The order amount may be set by the user, or may be set as the order amount by estimating the consumption of the product 50. Also, the order amount may be set to an integral multiple of the sales unit of the product. The information regarding the delivery destination to be transmitted to the EC server 40 is information needed for delivering the product to the user. The information regarding the delivery destination includes, for example, information regarding an address, a name, and a telephone number of the user. The information regarding the delivery destination is registered in the center server 30 by the user. The controller 301 stores the information regarding the delivery destination in the user information DB 311.

Here, the user information DB 311 holds user information regarding the user. The user information includes, for example, identification information of the user, the name of the user, the address of the user, and the identification information of the sensor device 10. The user information may include information regarding an automatic order. The information regarding the automatic order includes, for example, identification information of the product to be automatically ordered and the order amount per one delivery.

Further, in a case where the decrease amount of the product 50 in the predetermined period is larger than a threshold value of a decrease rate, the controller 301 determines that the product 50 placed on the storage location 51 by the user is not the product 50 corresponding to the storage location 51. That is, the controller 301 determines that the user misplaces the product 50. Hereinafter, the decrease amount of the product 50 in the predetermined period is also referred to as the decrease rate of the product 50.

For example, in a case where the soy sauce and the mirin are managed as the product 50 in separate storage locations 51, when the user places the mirin in the storage location 51 of the soy sauce, the mass of the soy sauce measured by the sensor device 10 is increased by an amount of the misplaced mirin. Then, in a case where the mirin stored in the storage location 51 of the soy sauce is used, a determination is made that the mass of the soy sauce is decreased. As described above, when the user makes a mistake in the placement location of the product 50, the consumption of the product 50 is apparently increased. Therefore, there is a possibility that the soy sauce is ordered even though an actual mass of the soy sauce is not decreased.

Therefore, in a case where the decrease amount of the product 50 in the predetermined period is larger than the threshold value of the decrease rate, the controller 301 notifies the user terminal 20 that there is a storage error of the product 50. Alternatively, in a case where the decrease amount of the product 50 in the predetermined period is larger than the threshold value of the decrease rate, the controller 301 makes an inquiry to the user as to whether or not to order the product 50 or does not order the product 50. In a case where the decrease amount of the product 50 in the predetermined period is larger than the threshold value of the decrease rate, the controller 301 may make an inquiry to the user as to whether or not to order the product 50, and may order the product 50 solely when an answer that the product 50 may be ordered is obtained from the user terminal 20.

The predetermined period is a period set on, for example, a weekly basis or a monthly basis. The predetermined period may be set by the user. The threshold value of the decrease rate is the decrease rate when the product 50 is consumed by the normal use of the user, and is, for example, the average value of the past decrease rates of the product 50. Alternatively, the threshold value of the decrease rate is a value obtained by adding a predetermined margin to the average value of the past decrease rates of the product 50. The average value of the past decrease rates of the product 50 may be, for example, the average value of the decrease rates calculated a plurality of times prior to the predetermined period described above. Alternatively, the average value of the past decrease rates of the product 50 may be the average value of the decrease rates in the same day of the week, the same day, or the same month in the past. Further, too old data has low correlation with the current consumption of the product 50 by the user, and thus may be used solely for recent data.

Figure 4:
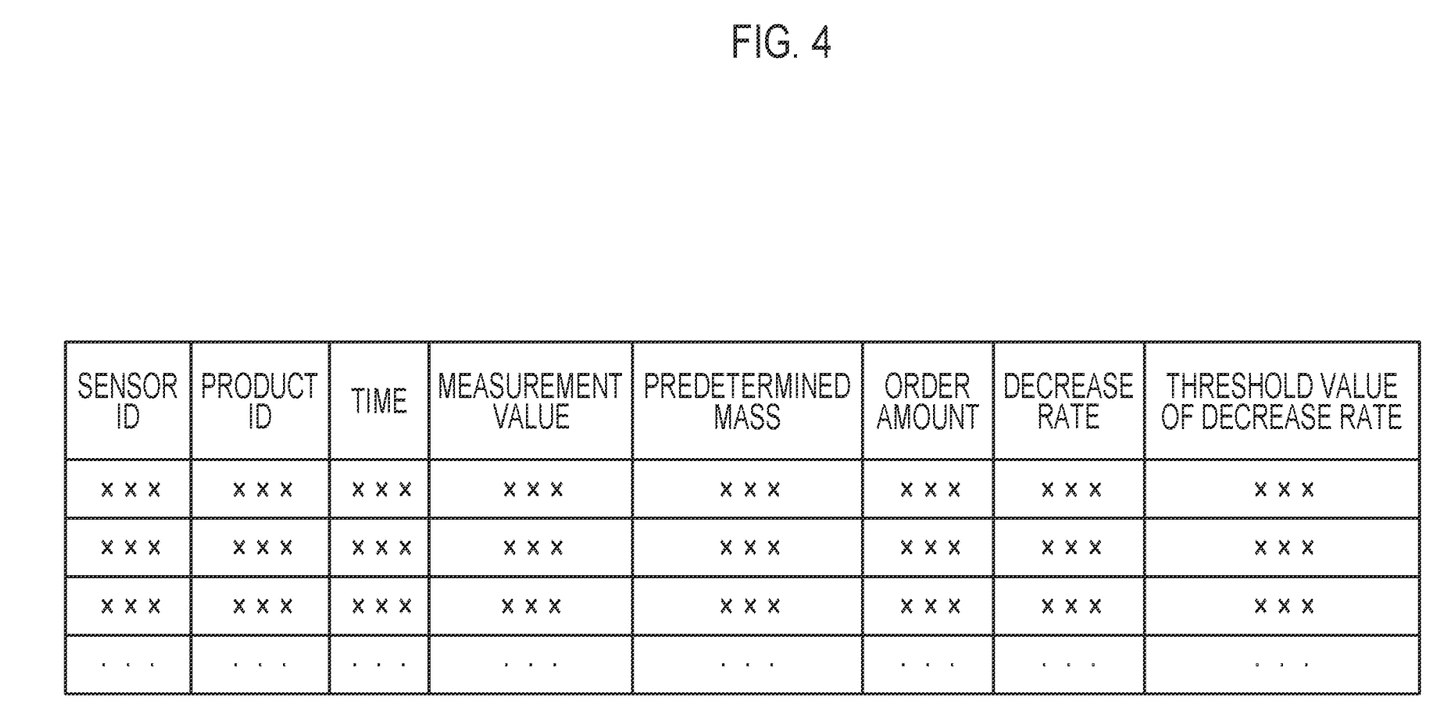
FIG. 4 is a table showing an example of a configuration of a product information table stored in a product information DB.

FIG. 4 is a table showing an example of a configuration of a product information table stored in the product information DB 312. The product information DB 312 is generated for each user. The product information table has fields of the sensor ID, the product ID, the time, the measurement value, the predetermined mass, the order amount, the decrease rate, and the threshold value of the decrease rate. The field of the sensor ID is a field to which the identification information (sensor ID) corresponding to the sensor device 10 is input. The sensor ID may be provided by the controller 301. The field of the product ID is a field to which the identification information (product ID) corresponding to each product 50 is input. The product ID is associated with the sensor ID. In the field of the time, the time when the mass is measured is input. Information regarding the time is included in the mass information. In the field of the measurement value, the mass of the product 50 included in the mass information received from the sensor device 10 is input.

The field of the predetermined mass is a field to which a threshold value (predetermined mass) of the mass for which the controller 301 orders the product 50 is input. The predetermined mass may be set by the user, or may be set by the controller 301. The field of the order amount is a field to which the amount (order amount) of the product 50 to be ordered at one time is input. Also, the order amount may be set by the user, or may be set by the controller 301. The field of the decrease rate is a field to which the decrease amount of the product 50 in the predetermined period is input. The controller 301 calculates a difference between the mass of the product 50 at the beginning of the predetermined period and the mass of the product 50 at the present time, as the decrease rate. The threshold value of the decrease rate is input to the field of the threshold value of the decrease rate. The threshold value of the decrease rate is calculated by the controller 301. For example, the controller 301 may refer to the product information table and extract a plurality of the decrease rates calculated prior to the predetermined period to calculate the average value or a value obtained by adding a margin to the average value, as the threshold value of the decrease rate. The plurality of decrease rates to be extracted may be decrease rates in continuous periods, for example. Also, parts of the periods for which the decrease rate is calculated may overlap.

Next, the user terminal 20 includes, as a functional component, a controller 201. The processor 21 of the user terminal 20 executes the process of the controller 201 by the computer program on the main storage unit 22. Note that a part of the controller 201 may be executed by the hardware circuit. The controller 201 generates the user information. The controller 201 displays an operation screen that urges the user to input the user information on the display 25, and generates the user information in response to the input to the input unit 24 by the user. The generated user information is transmitted to the center server 30 by the controller 201. For example, the user information may be generated and transmitted to the center server 30 when the registering of the user is performed.

In addition, the controller 201 receives a notification regarding the order from the center server 30 or the EC server 40. The controller 201 displays this notification on the display 25. For example, in a case where the center server 30 orders the product 50, the controller 201 receives information regarding that the center server 30 orders the product 50. Further, for example, in a case where the EC server 40 receives the order, the controller 201 receives information regarding that the EC server 40 receives the order. Further, for example, in a case where the EC server 40 ships the product 50, the controller 201 receives information regarding the delivery.

Also, the controller 201 receives a notification from the center server 30 that the product 50 is not ordered. The controller 201 that receives this notification displays the image in response to this notification on the display 25. Further, the controller 201 receives the inquiry from the center server 30 as to whether or not the product 50 may be ordered. Then, the controller 201 displays the received inquiry on the display 25 and displays a word that urges the user to input the answer. Further, the answer in response to the input to the input unit 24 by the user is generated and transmitted to the center server 30.

Figure 5:
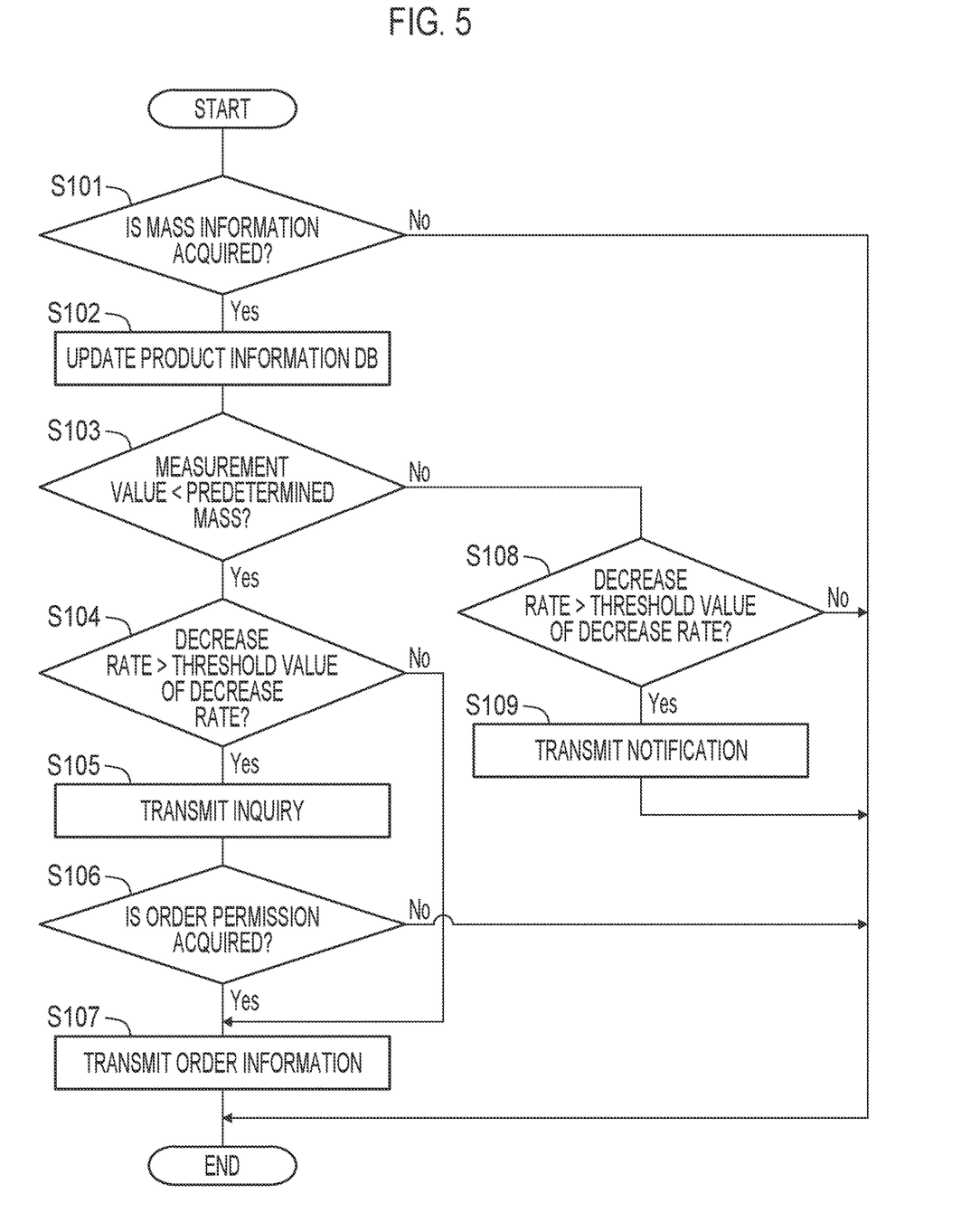
FIG. 5 is a flowchart of an order process according to a first embodiment.

Hereinafter, an order process that is a process in which the center server 30 orders the product 50 will be described. FIG. 5 is a flowchart of the order process according to the present embodiment. The order process shown in FIG. 5 is repeatedly executed by the center server 30 for each product 50 of each user at predetermined time intervals. Note that the description will be made on the assumption that needed information is stored in the user information DB 311.

In step S101, the controller 301 determines whether or not the mass information is acquired from the sensor device 10. In a case where a positive determination is made in step S101, the process proceeds to step S102, in a case where a negative determination is made in step S101, the routine is terminated. In step S102, the controller 301 updates the product information DB 312 based on the mass information. That is, based on the mass information, information is input to each field of the sensor ID, the product ID, the time, and the measurement value. Further, the decrease amount of the product 50 in the predetermined period until the present time is calculated as the decrease rate and input to the field of the decrease rate. In addition, the threshold value of the decrease rate is calculated based on the past decrease rate. For the predetermined mass and the order amount, for example, values set in advance by the user are input.

In step S103, the controller 301 determines whether or not the measurement value of the mass is smaller than the predetermined mass. That is, the controller 301 determines whether or not the mass of the product 50 is decreased to the extent that the order for the product is needed. In a case where a positive determination is made in step S103, the process proceeds to step S104, and in a case where a negative determination is made in step S103, the process proceeds to step S108.

In step S104, the controller 301 determines whether or not the decrease rate is larger than the threshold value of the decrease rate. In step S104, the controller 301 determines whether or not the consumption of the product 50 is larger than normal. In a case where a positive determination is made in step S104, the process proceeds to step S105, and in a case where a negative determination is made in step S104, the process proceeds to step S107. In a case where a negative determination is made in step S104, the product 50 is normally consumed, and thus the controller 301 transmits the order information to the EC server 40 in step S107. The order information includes the needed information for delivery the product 50, such as the user information, the product ID, and the order amount. As described above, the controller 301 orders the product 50 from the EC server 40.

On the other hand, in step S105, the controller 301 transmits the inquiry to the user terminal 20. This inquiry includes a notification that the consumption of the product 50 is larger than normal, and an inquiry as to whether or not the product 50 may be ordered. When the user terminal 20 receives the notification, the image in response to this notification is displayed on the display 25. Further, when the user terminal 20 receives the inquiry, the image in response to this inquiry is displayed on the display 25, and the word that urges the user to make the answer is displayed on the display 25.

Then, in step S106, the controller 301 determines whether or not the permission to order the product 50 is acquired from the user terminal 20. The permission to order the product 50 is transmitted from the user terminal 20 by performing predetermined input by the user to the user terminal 20. Note that a case where there is no answer from the user terminal 20 even after the lapse of predetermined time may be treated as a case where there is no permission to order the product 50. In a case where a positive determination is made in step S106, the process proceeds to step S107, and the controller 301 transmits the order information to the EC server 40. On the other hand, in a case where a negative determination is made in step S106, the routine is terminated, so that the product 50 is not ordered.

Further, in step S108, the controller 301 determines whether or not the decrease rate is larger than the threshold value of the decrease rate. Although the order is not needed, the process in step S108 is executed to provide the notification to the user when the consumption of the product 50 is large. In a case where a positive determination is made in step S108, the process proceeds to step S109, in a case where a negative determination is made in step S108, the routine is terminated. In step S109, the controller 301 transmits the notification to the user terminal 20. This notification includes a notification that the consumption of the product 50 is larger than normal. When the user terminal 20 receives this notification, the image in response to this notification is displayed on the display 25. By displaying the image on the display 25, the user can be aware that the product 50 is misplaced.

Note that in the routine shown in FIG. 5, in a case where the decrease rate is larger than the threshold value of the decrease rate, the inquiry about the order is transmitted to the user terminal 20 in step S105, but this process is not always needed. For example, in a case where the decrease rate is larger than the threshold value of the decrease rate, the routine shown in FIG. 5 may be terminated without ordering the product 50. In this case, when a positive determination is made in step S104, the routine shown in FIG. 4 is terminated. Therefore, the processes of step S105 and step S106 are omitted. Further, alternatively, in a case where the decrease rate is larger than the threshold value of the decrease rate, solely the notification of the above fact may be provided to the user terminal 20 without ordering the product 50.

As described above, in the present embodiment, in a case where the product 50 is ordered based on the mass of the product 50, when the consumption of the product 50 is larger than normal, the notification of the above fact is provided to the user or the inquiry as to whether or not to order the product 50 is made to the user. As a result, the order for the product 50 more than needed can be suppressed in a case where the user places the product 50 in the incorrect storage location 51. Therefore, the stock of the product 50 can be managed more accurately.

Second Embodiment

Even in a case where the decrease rate of the product 50 is larger than the threshold value of the decrease rate, there is a case where the product 50 is normally consumed. For example, the consumption of the product 50 may be transitorily increased due to a visitor at user's home. In such a case, in the present embodiment, the product is ordered and the decrease rate in this case is not included in the next calculation of the threshold value of the decrease rate.

On the other hand, for example, in a case where the number of residents at user's home is increased, the consumption of the product 50 is increased thereafter. In such a case, in the present embodiment, the product is ordered and the decrease rate in this case is included in the next calculation of the threshold value of the decrease rate. In addition, in a case where the threshold value of the decrease rate is calculated next, the previous decrease rate may not be included.

Therefore, in a case where the decrease rate of the product 50 is larger than the threshold value of the decrease rate, the controller 301 makes an inquiry to the user whether or not to include the present decrease rate when the threshold value of the decrease rate is calculated next.

Figure 6:
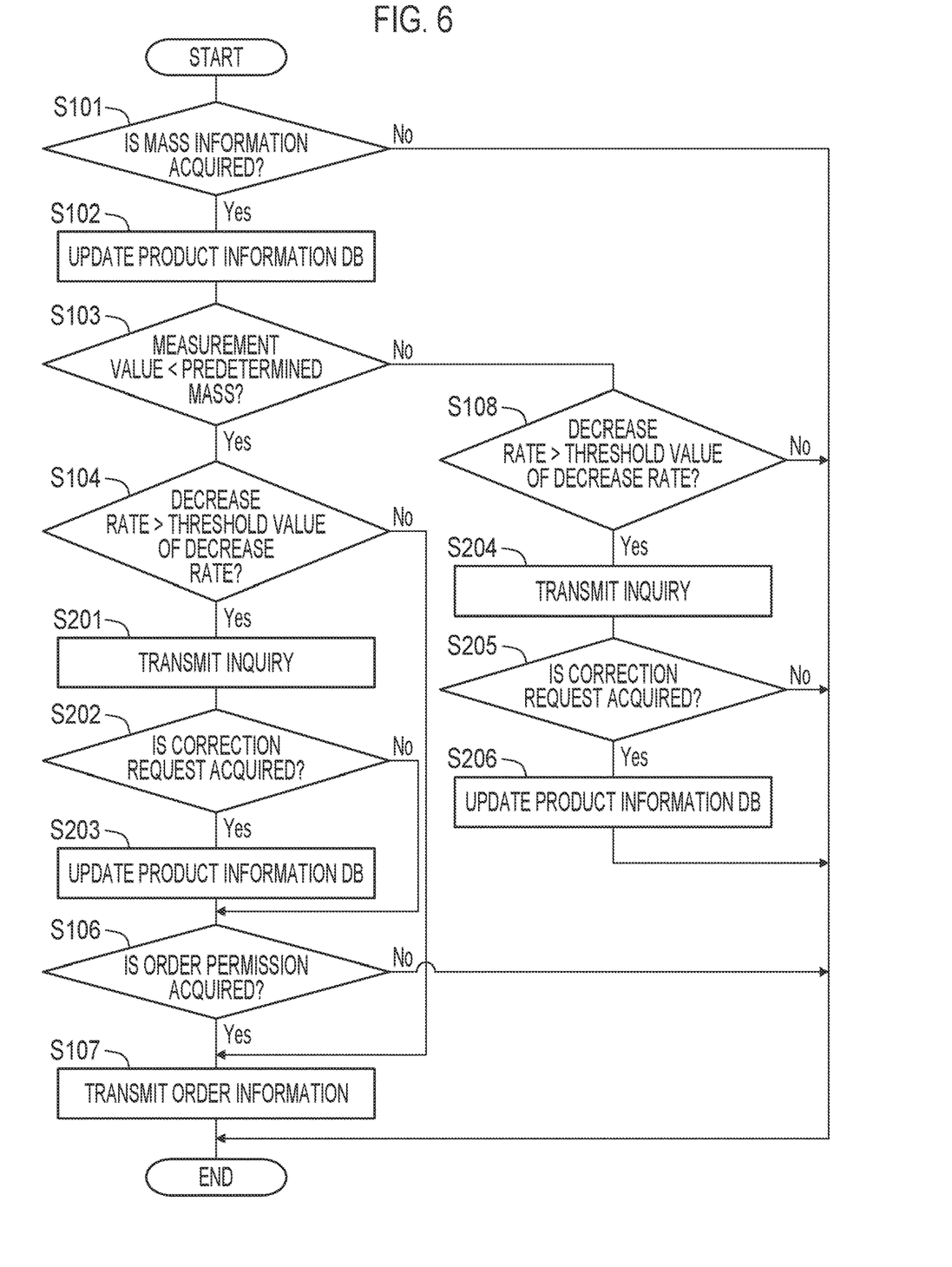
FIG. 6 is a flowchart of an order process according to a second embodiment.

Hereinafter, the order process that is the process in which the center server 30 orders the product 50 will be described. FIG. 6 is a flowchart of an order process according to the present embodiment. The order process shown in FIG. 6 is repeatedly executed by the center server 30 for each product 50 of each user at predetermined time intervals. Note that the description will be made on the assumption that the needed information is stored in the user information DB 311. In addition, a step in which the same process as the routine shown in FIG. 5 is executed is denoted by the same step number, and the description thereof will be omitted.

In the routine shown in FIG. 6, in a case where a positive determination is made in step S104, the process proceeds to step S201. In step S201, the controller 301 transmits the inquiry to the user terminal 20. The inquiry relating to step S201 includes a notification that the consumption of product 50 is larger than normal, an inquiry as to whether or not product 50 may be ordered, and an inquiry as to whether or not to reflect the present decrease rate in the next calculation of the threshold value of the decrease rate.

For example, when the decrease rate is transitorily changed due to the visitor, the present decrease rate is not needed to be reflected in the next calculation of the threshold value of the decrease rate. On the other hand, when the decrease rate is changed due to a change in a family structure, the current decrease rate is needed to be reflected in the next calculation of the threshold value of the decrease rate. Further, when the decrease rate is changed due to the change in the family structure, the correlation between the previous threshold value of the decrease rate and the next consumption of the product 50 is low, and thus the threshold value of the decrease rate may be reset. Therefore, the inquiry as to whether or not to reset the threshold value of the decrease rate may be made to the user.

In step S202, a determination is made as to whether or not the controller 301 acquires a correction request from the user terminal 20. The correction request is a request regarding correction of the product information DB 312. For example, in a case where the consumption of the product 50 is transitorily increased due to the visitor, the user requests the user terminal 20 not to reflect the present decrease rate in the next calculation of the threshold value of the decrease rate. As a result, the controller 301 does not use the information stored in a corresponding record for the next calculation of the threshold value of the decrease rate. In this case, for example, the controller 301 may delete this record from the product information DB 312.

Alternatively, for example, in a case where the decrease rate is changed due to the change in the family structure, the user requests the user terminal 20 to reflect the present decrease rate in the next calculation of the threshold value of the decrease rate. As a result, the controller 301 reflects the information included in this record in the next calculation of the threshold value of the decrease rate. In this case, the past decrease rate may not be used for the calculation of the threshold value of the decrease rate, or the past record may be deleted from the product information DB 312.

In a case where a positive determination is made in step S202, the process proceeds to step S203, the controller 301 updates the product information DB 312 as described above, and in a case where a negative determination is made in step S202, the process proceeds to step S106.

Further, in the routine shown in FIG. 6, in a case where a positive determination is made in step S108, the process proceeds to step S204. In step S204, the controller 301 transmits the inquiry to the user terminal 20. The inquiry relating to step S204 includes a notification that the consumption of product 50 is larger than normal and an inquiry as to whether or not to reflect the present decrease rate in the next calculation of the threshold value of the decrease rate. Hereinafter, in step S205 and step S206, the processes same as those in step S202 and step S203 are executed, and thus the description thereof will be omitted.

As described above, according to the present embodiment, even in a case where the consumption of the product 50 is actually increased, the product can be appropriately ordered.

Other Embodiments

The embodiments described above are merely examples, and the present disclosure can be implemented with appropriate changes within a scope not departing from the gist of the present disclosure.

The process and the means described in the present disclosure can be freely combined and implemented as long as no technical inconsistency occurs.

Also, the process executed by one device in the description may be allocated and executed by a plurality of devices. Alternatively, the process executed by different devices in the description may be executed by one device. In the computer system, what kind of the hardware configuration (server configuration) is used to realize each function can be flexibly changed.

Further, in the above embodiments, the consumption of the product 50 is acquired based on the mass of the product 50, but alternatively, the present disclosure can be applied in a case where the radio frequency identifier (RFID) tag is attached to the product 50 to manage the stock, for example. By reading the RFID tag attached to the product 50 by the sensor, the stock amount of the product 50 can be detected. However, for example, even when the RFID tag is attached incorrectly, the decrease amount of the product 50 can be apparently increased. In this case, the notification may be transmitted to the user terminal 20.

Further, in the above embodiments, the mass of the product 50 is measured, and the decrease amount of the mass is associated with the consumption of the product 50. Alternatively, the association is not limited to the mass of the product 50, any association can be made in the same manner as long as there is association with the consumption of the product 50. For example, in the present disclosure, the order amount of the product 50 has correlation with the consumption of the product 50, and thus the inquiry or the notification can be made to the user based on the order amount of the product 50.

Further, in the above embodiment, the threshold value of the decrease rate is calculated based on past decrease rate and the decrease rate is compared with the threshold value of the decrease rate, but alternatively, the consumption of the product 50 may be estimated based on a schedule of the user or behavior of the user and this consumption may be compared with the consumption detected by the sensor device 10. For example, in a case where a cooking recipe is searched by the user terminal 20, the consumption of the product 50 used for the cooking may be estimated and integrated. Then, in a case where a difference between the integrated value and the decrease amount of the product 50 detected by the sensor device 10 is equal to or larger than the threshold value, the notification that the storage location 51 of the product 50 is incorrect may be provided to the user.

The user who sees the display of the user terminal 20 that receives the notification or the inquiry from the center server 30 may return the product 50 to the correct position. In this case, the mass is decreased in the storage location 51 prior to the movement, and the mass is increased in the storage location 51 after the movement. Since the decrease rate calculated in such a case is different from the decrease in the mass due to the consumption of the product 50, it is preferable not to reflect the decrease rate in the next calculation of the threshold value of the decrease rate. Therefore, for example, the threshold value of the decrease rate may be calculated by ignoring the decrease rate calculated in a certain period after the answer to the inquiry is received.

Further, the controller 301 may determine that the product 50 is placed in the incorrect storage location 51 when the mass of the product 50 is not increased even though the product 50 is ordered. In this case, the notification may be provided to the user terminal 20 to place the product 50 in the correct position.

Further, the controller 301 may determine that the product 50 is misplaced or the user purchases the product 50 when the mass of the product 50 is increased even though the product 50 is not ordered. In this case, the inquiry as to whether or not the product 50 is misplaced or the user purchases the product 50 may be made to the user.

The present disclosure can also be realized by supplying a computer program that implements the functions described in the above embodiments to a computer, and reading and executing the program by one or more processors included in the computer. Such a computer program may be provided to the computer by a non-transitory computer-readable storage medium that can be connected to a system bus of the computer, or may be provided to the computer via a network. The non-transitory computer-readable storage medium includes, for example, any type of disk, such as a magnetic disk (floppy (registered trademark) disk or hard disk drive (HDD)), an optical disk (CD-ROM, DVD disk, or Blu-ray disk), a read only memory (ROM), a random access memory (RAM), an EPROM, an EEPROM, a magnetic card, a flash memory, an optical card, and any type of media suitable for storing electronic instructions.

What is claimed is:

1. An information processing device comprising a controller configured to execute
    acquiring a detection value obtained by detecting an amount of a product stored in a storage location corresponding to the product by a sensor at a predetermined cycle;
    transmitting a notification regarding a storage error of the product to a user terminal via a network in a case where a decrease amount of the product based on the detection value of the sensor in a predetermined period is larger than a threshold value, the threshold value being an average value of past decrease amounts of the product;
    transmitting an inquiry as to whether to reflect a present decrease amount in a next calculation of the threshold value to the user terminal in a case where the decrease amount of the product in the predetermined period is larger than the threshold value; and
    resetting the threshold value by calculating the average value based on the present decrease amount and the past decrease amounts, upon acquiring a resetting request from the user terminal.

2. The information processing device according to claim 1, wherein the controller is configured to acquire mass of the product placed in the storage location, as the detection value.

3. The information processing device according to claim 1, wherein the controller is configured to acquire information regarding an IC tag attached to the product placed in the storage location, as the detection value.

4. The information processing device according to claim 1, further comprising a storage unit configured to store the decrease amount of the product,
    wherein the controller is configured to calculate the average value of the past decrease amounts of the product stored in the storage unit, as the threshold value.

5. The information processing device according to claim 1, wherein the controller is configured to
    generate order information in a case where the detection value is smaller than a predetermined value, and
    transmit the order information to a server that processes an order for the product.

6. The information processing device according to claim 1, wherein the controller is configured to transmit an inquiry as to whether or not to order the product to the user terminal in a case where the detection value is smaller than a predetermined value and the decrease amount of the product in the predetermined period calculated based on the detection value of the sensor is larger than the threshold value.

7. An information processing method executed by a computer, the information processing method comprising:
    acquiring a detection value obtained by detecting an amount of a product stored in a storage location corresponding to the product by a sensor at a predetermined cycle;
    transmitting a notification regarding a storage error of the product to a user terminal via a network in a case where a decrease amount of the product based on the detection value of the sensor in a predetermined period is larger than a threshold value, the threshold value being an average value of past decrease amounts of the product;
    transmitting an inquiry as to whether to reflect a present decrease amount in a next calculation of the threshold value to the user terminal in a case where the decrease amount of the product in the predetermined period is larger than the threshold value; and resetting the threshold value by calculating the average value based on the present decrease amount and the past decrease amounts, upon acquiring a resetting request from the user terminal.

8. The information processing method according to claim 7, wherein the computer is configured to acquire mass of the product placed in the storage location, as the detection value.

9. The information processing method according to claim 7, wherein the computer is configured to acquire information regarding an IC tag attached to the product placed in the storage location, as the detection value.

10. The information processing method according to claim 7, wherein the computer is configured to calculate the average value of the past decrease amounts of the product stored in a storage unit configured to store the decrease amount of the product, as the threshold value.

11. The information processing method according to claim 7, wherein the computer is configured to
generate order information in a case where the detection value is smaller than a predetermined value, and
transmit the order information to a server that processes an order for the product.

12. The information processing method according to claim 7, wherein the computer is configured to transmit an inquiry as to whether or not to order the product to the user terminal in a case where the detection value is smaller than a predetermined value and the decrease amount of the product in the predetermined period calculated based on the detection value of the sensor is larger than the threshold value.

13. A system comprising:
a sensor configured to detect an amount of a product stored in a storage location corresponding to the product; and
a server including a controller configured to execute
acquiring a detection value detected by the sensor at a predetermined cycle;
transmitting a notification regarding a storage error of the product to a user terminal via a network in a case where a decrease amount of the product based on the detection value of the sensor in a predetermined period is larger than a threshold value, the threshold value being an average value of past decrease amounts of the product;
transmitting an inquiry as to whether to reflect a present decrease amount in a next calculation of the threshold value to the user terminal in a case where the decrease amount of the product in the predetermined period is larger than the threshold value; and
resetting the threshold value by calculating the average value based on the present decrease amount and the past decrease amounts, upon acquiring a resetting request from the user terminal.

14. The system according to claim 13, wherein the controller is configured to acquire mass of the product placed in the storage location, as the detection value.

15. The system according to claim 13, further comprising a storage unit configured to store the decrease amount of the product,
wherein the controller is configured to calculate the average value of the past decrease amounts of the product stored in the storage unit, as the threshold value.

16. The system according to claim 13, wherein the controller is configured to
generate order information in a case where the detection value is smaller than a predetermined value, and
transmit the order information to a server that processes an order for the product.

17. The system according to claim 13, wherein the controller is configured to transmit an inquiry as to whether or not to order the product to the user terminal in a case where the detection value is smaller than a predetermined value and the decrease amount of the product in the predetermined period calculated based on the detection value of the sensor is larger than the threshold value.

* * * * *